United States Patent
Lim et al.

(10) Patent No.: US 6,732,181 B2
(45) Date of Patent: May 4, 2004

(54) INTERNET-ENABLED SERVICE MANAGEMENT AND AUTHORIZATION SYSTEM AND METHOD

(75) Inventors: Chang Lim, North Vancouver (CA); Jimmy K. Hui, Vancouver (CA); Wendy W. J. Wu, Vancouver (CA); Timmy W. Lee, Burnaby (CA); Heng M. Look, Burnaby (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 10/179,171

(22) Filed: Jun. 26, 2002

(65) Prior Publication Data

US 2002/0169866 A1 Nov. 14, 2002

Related U.S. Application Data

(63) Continuation of application No. 09/069,566, filed on Apr. 29, 1998, now Pat. No. 6,434,619.

(51) Int. Cl.[7] .............................................. G06F 15/16
(52) U.S. Cl. .................... 709/229; 709/202; 709/203; 709/220; 709/223; 713/200; 707/9; 707/10; 370/254
(58) Field of Search ................ 709/200–203, 709/217–219, 220–221, 223–225, 227–229, 245–246, 104–105; 713/200–202; 707/8–10; 370/254, 389, 397, 409

(56) References Cited

U.S. PATENT DOCUMENTS

| | | | | |
|---|---|---|---|---|
| 5,021,949 A | * | 6/1991 | Morten et al. ............... | 709/231 |
| 5,295,139 A | * | 3/1994 | Palmer ........................ | 370/255 |
| 5,586,260 A | * | 12/1996 | Hu .............................. | 709/203 |
| 5,678,041 A | * | 10/1997 | Baker et al. ................. | 709/229 |
| 5,768,271 A | * | 6/1998 | Seid et al. ................... | 370/389 |
| 5,778,174 A | * | 7/1998 | Cain ........................... | 713/201 |
| 5,784,058 A | * | 7/1998 | LaStrange et al. .......... | 345/340 |
| 5,796,952 A | * | 8/1998 | Davis et al. ................. | 709/224 |
| 5,815,665 A | * | 9/1998 | Teper et al. ................. | 709/229 |
| 5,854,903 A | * | 12/1998 | Morrison et al. ........... | 709/249 |
| 5,872,918 A | * | 2/1999 | Malomsoky et al. ....... | 709/220 |
| 5,928,333 A | * | 7/1999 | Landfield et al. ........... | 709/245 |
| 5,948,054 A | * | 9/1999 | Nielsen ....................... | 709/200 |
| 6,003,084 A | * | 12/1999 | Green et al. ................. | 709/227 |
| 6,032,175 A | * | 2/2000 | Fletcher et al. ............. | 709/200 |
| 6,055,575 A | * | 4/2000 | Paulsen et al. .............. | 709/229 |
| 6,079,020 A | * | 6/2000 | Liu .............................. | 709/223 |
| 6,104,699 A | * | 8/2000 | Holender et al. ........... | 709/221 |
| 6,233,618 B1 | * | 5/2001 | Shannon ...................... | 709/229 |
| 6,289,370 B1 | * | 9/2001 | Panarello et al. ........... | 709/203 |
| 6,434,619 B1 | * | 8/2002 | Lim et al. .................... | 709/229 |
| 6,564,261 B1 | * | 5/2003 | Gudjonsson et al. ....... | 709/227 |
| 6,615,258 B1 | * | 9/2003 | Barry et al. ................. | 709/229 |

* cited by examiner

Primary Examiner—Bharat Barot
(74) Attorney, Agent, or Firm—Marks & Clerk

(57) ABSTRACT

A system and method for the management of communication services from a service provider by a customer of the provider. The management system employs an Internet-based architecture that provides access to user's virtual private networks via an end user browser. The customer service management (CSM) system service director (SD) maintains a relational database for storing user specific information retrieved from the network manager.

12 Claims, 11 Drawing Sheets

1 → IP, ID, PW
2 ← COOKIE (ID)
3 → IP, COOKIE(ID)

| STATUS | APPLICATION NAME | BUTTON IMAGE PATH | URL | TARGET LOCATION |
|---|---|---|---|---|
| ON ▷ | CONCORD | HTTP://WHITER | HTTP://CONCORD | RIGHT FRAME ▷ |
| OFF ▷ | | | | RIGHT FRAME ▷ |
| OFF ▷ | | | | RIGHT FRAME ▷ |
| OFF ▷ | | | | RIGHT FRAME ▷ |
| OFF ▷ | | | | RIGHT FRAME ▷ |
| CHANGE | | | | |

FIG. 10

INTERNET-ENABLED SERVICE MANAGEMENT AND AUTHORIZATION SYSTEM AND METHOD

This is a continuation application of application Ser. No. 09/069,566, filed Apr. 29, 1998, now U.S. Pat. No. 6,434,619.

FIELD OF THE INVENTION

This invention relates to service management of digital communications networks and, in particular, to the management of communications services from a service provider by a customer of the provider.

BACKGROUND OF THE INVENTION

A network management system (NMS) provides operators with a full range of configuration capabilities on multi-technology communications networks, as represented in FIG. 1. The NMS may be used to configure the network, manage links and paths, monitor network operations and resolve problems from a central location. For example, traffic and service parameters on Frame Relay, ATM, X.25, SONET/SDH and ISDN links and paths can be configured at the NMS, typically through a point-and-click graphical user interface (GUI). End-to-end connections through the network can be established by simply clicking on endpoints depicted on the GUI. Network reliability is ensured through automatic rerouting and restoration functions of the NMS.

Conventional NMSs, such as the MainStreetXpress (trademark) 46020 from Newbridge Networks Corporation, include functionality to partition communications network resources whereby a service provider can resell bandwidth and services to customers, and effectively manage the resources, customers and operations personnel. A network can be partitioned, for example, to divide it by region or department, or to provide Virtual Private Networks (VPNs) for multiple customers. Two of the types of VPNs are a virtual backbone network (VBN) or a virtual service network (VSN). For sophisticated partitioning applications, it is possible to subdivide a customer's VBN into multiple VSNs.

A VBN partition is a physical partition of network resources. This form of a partition contains bandwidth dedicated to that partition only, and is characterized on the NMS by a physical view of the network equipment and bandwidth. The resources in a single VBN may be shared, permitting customers to interact with the network as if it were their own private backbone network.

VSN partitioning provides a more service oriented view of the network, characterized on the NMS by the subscribed services and the access points in and out of the network for a particular customer. This form of a partition contains pathend equipment only. Bandwidth is drawn from the 'parent' partition which may be a VBN or the 'supply' network (i.e., the service provider's physical network).

From large corporate customers supporting mission-critical business applications, to small business clients selling products worldwide, service provider subscribers are demanding increased visibility and control of their subscribed communications services. Whether they are looking for end-to-end visibility across the corporate-wide network, or service performance information, customers want to ensure their network is cost-effective and responsive to rapidly changing needs. For service providers, meeting this requirement creates an opportunity for service differentiation and competitive advantage.

The demand for customer service management (CSM) features is being driven in large part by the growth in outsourcing of bandwidth by enterprise managers, value-added communications resellers, and other telecommunications subscribers. Most service providers are looking for customer network management (CNM) solutions to meet these needs—solutions that typically extend network status and performance information to subscribers.

SUMMARY OF THE INVENTION

The CSM Service Director (SD), embodied by the present invention, makes it possible for service providers to offer their customers the ability to monitor and manage their outsourced network resources in much the same way as they manage their in-house resources, giving them control of their VPNs.

The information provided by the CSM SD reflects the view the service provider wants to extend to its customer. In most cases, this will mean that customers are given the ability to view their network endpoints and the status of the associated connections. Details of the network, in terms of network equipment and the routing of the connections, are transparent to the customer. Instead the customer sees access points and connections between these access points.

The SD introduces a Web-based presentation environment and a number of valuable CSM applications that can be accessed via the Web medium. The CSM Service Director brings the flexibility and manageability of Web browser and Internet/Intranet technologies to the CSM services offered by traditional NMSs. It works with the industry standard Web browsers, Netscape Navigator and Microsoft Internet Explorer. The CSM Service Director extends the CSM market beyond large corporate customers to include medium and small business subscribers.

BRIEF DESCRIPTION OF THE DRAWINGS

The invention will now be described in greater detail with reference to the attached drawings wherein:

FIG. 10 illustrates a third party application configuration screen;

DETAILED DESCRIPTION OF THE INVENTION

Figure 1:
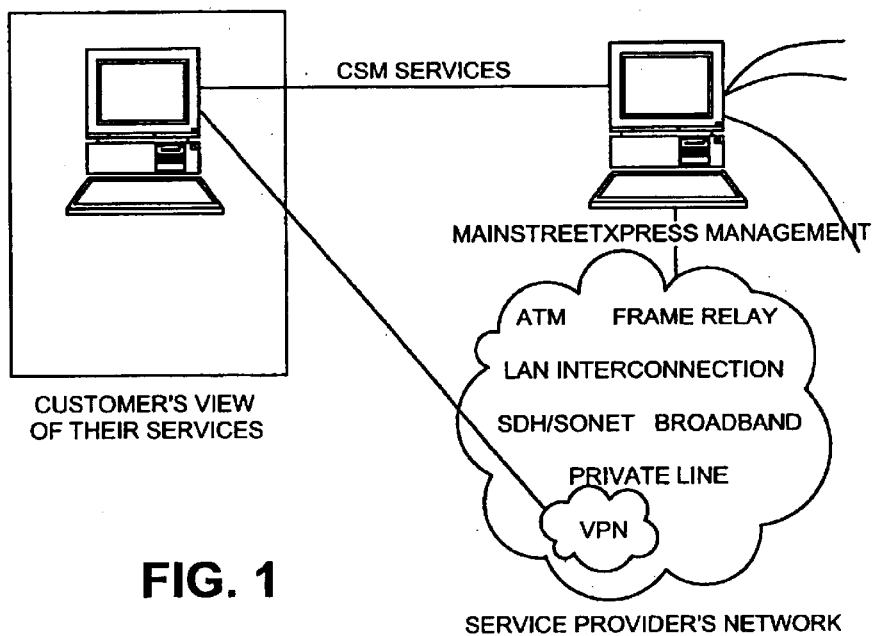
FIG. 1 is a high level diagram of a system for providing CSM services via a multi-technology network.

As shown in FIG. 1 the system of the present invention relates to a network whereby a service provider offers a customer a variety of resources and services via a virtual private network (VPN). A network management system allows an operator to configure the network in accordance with specific requirements.

Figure 2:
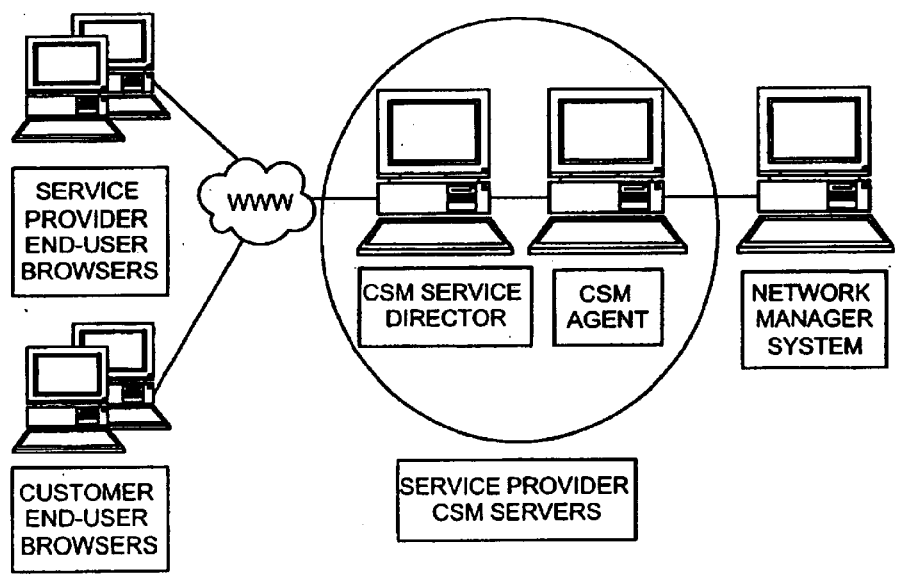
FIG. 2 illustrates the CSM services system according to the present invention.

FIG. 2 is a high level view of the system according to the invention. The NMS is used to configure the network as shown in FIG. 1. The customer service management (CSM) system includes a service director (SD) and a CSM agent. In the following discussion the term CSM Agent is meant to include a Newbridge Networks product known as CSM Agents. The CSM Agent server stores SNMP Community String (which is equivalent to a CSM Service Director Customer or a Newbridge 46020 VSN), network configuration and network statistical information in a data repository which is implemented using a typical relational database, such as an Informix database, on the CSM Agent. The information maintained therein is received from the NMS which communicates with the CSM Agent, for example, through the well-known Simple Network Management Protocol (SNMP). The NMS may be any commercially available product that supports SNMP and virtual network partitioning for respective customers, an example of which being the MainStreetXpress 46020 Network Manager by Newbridge Networks Corporation.

The CSM Service Director (SD) server accesses the database maintained by the CSM Agent using structured query language (SQL) which is the standard method of accessing relational databases. End-users employing browser clients interact with the CSM Service Director (SD) server via world wide web (WWW) based communications, whereby the SD server receives service management queries from the clients, retrieves corresponding customer service information from the CSM Agent's database and generates an appropriate graphical based response which is returned to the clients for display by their browsers.

Within the data repository, the customer information identifies each customer subscribing to the CSM service and for each customer, there is associated network configuration and network statistical information. The network configuration information includes configuration parameters for access ports and virtual circuits, for example, as described in the Frame Relay Service Management Information Base (MIB) (IETF Network Working Group, "Definitions of Managed Objects for Frame Relay Service", RFC1604) and the ATM MIB (IETF Network Working Group, "Definitions of Managed Objects for ATM Management", RFC1695). The network statistical information includes the appropriate information to process statistics requests for the supported MIBs. The CSM Agent receives customer information and configuration changes from the NMS as needed. These changes are processed by the CSM Agent as they are received. The CSM Agent receives statistical samples from the NMS on a periodic basis, for example, in 15 minute intervals. The 15 minute intervals are saved for a 24 hour period (i.e., 96 intervals are saved) and a rolling total of these last 96 intervals is maintained. In addition, the repository stores hourly, daily and monthly accumulations of the statistical intervals. Hourly accumulations begin and end on the hour (e.g., 3:00 to 4:00). The daily accumulations begin and end at midnight. The monthly accumulations begin at midnight of the first day of the month and end at midnight of the last day of the month. The current hourly, daily and monthly accumulations are updated as each sample is received making these totals as up to date as possible. The historical statistics are available until the data is purged.

Although the preferred embodiment of the CSM system incorporates the exchange of network data with the NMS using an SNMP interface to the CSM Agent server whose data repository is in turn accessed by the SD server, the SD server could support a direct interface to the NMS and multi-vendor network management products to support multi-vendor service management.

The CSM Service Director client interface is a WWW browser capable of supporting HTML 3.0, Java Script 1.1 and Java.1.0.2 (e.g. Netscape Navigator 3.01 or Microsoft Internet Explorer 3.0). HTTP is stateless protocol and thus each CSM Service Director screen needs to contain sufficient user data, via hidden field values, to display subsequent screens.

A request from the WWW browser is sent to the CSM Service Director back end server via the Web Server. The CSM Service Director back end server processes the web client's request and returns a composed page to the client via the Web server.

Each HTML page contains HTML, Java Script, and Java Applets. HTML is used to compose Web pages. Java Script is used for local client side processing (e.g. button actions, update time stamps, setting cookies.) Java Applets are used to provide more demanding Web interactions (e.g. displaying maps).

Figure 3:
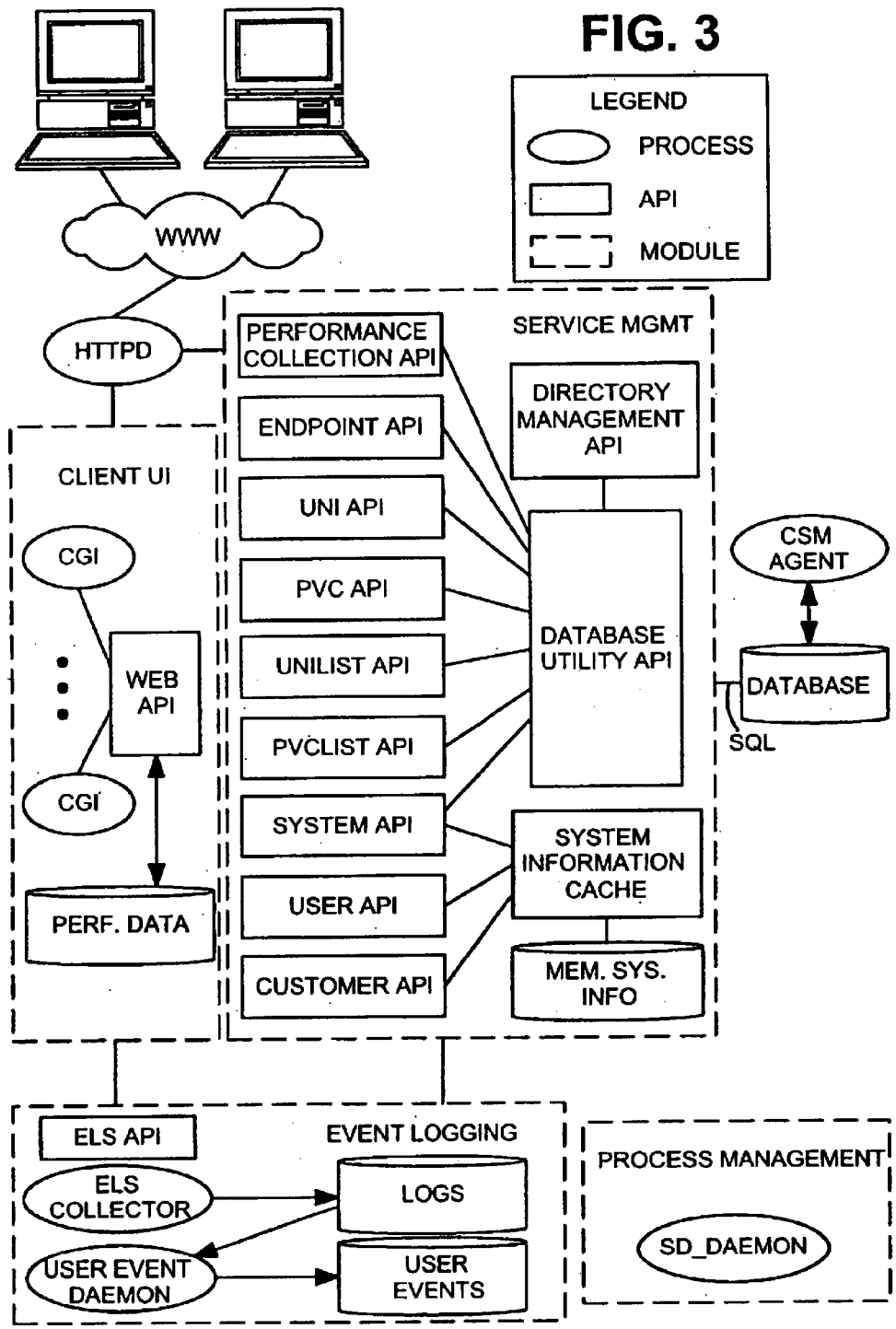
FIG. 3 is a diagram showing the make up of the HTML-CGI based software architecture.

The software structure of the SD server characterizes an HTML-common gateway interface (CGI) based architecture which consists of both server application processing and client UI screen page generation. FIG. 3 shows the HTML-CGI based software architecture of the SD. As previously described, the CSM Agent is an external process that maintains the database of customer service information which is retrieved by the SD via an SQL interface.

The CSM Service Director constitutes a software application that is executed on a conventional server platform known as a hypertext transfer protocol deamon (HTTPD) that runs on a UNIX based data processing unit. The HTTPD facilitates communications over the WWW between clients and the server, and an example of the HTTPD is the Netscape Enterprise Server. The CSM Service Director application consists of four major modules: Client UI, Service Management, Process Management, and Event Logging. The modules in general comprise autonomous processes and/or application program interfaces (APIs) which defined callable routines to derive certain information.

The Client UI module provides functionality for managing the requests from web clients. Each action taken by a service end-user triggers a lightweight CGI process that retrieves/filters/sorts data through a Web API from the Service Management module, which data is stored in a RAM workspace labeled as Perf Data in FIG. 3. A corresponding HTML page is then generated as the response.

As shown in FIG. 3 the client UI module includes a CGI parser, a WEB services API and a WEB page formatting API.

The CGI parser provides a lightweight CGI program to parse incoming parameters and invoke the corresponding WEB Services API. It consists of a set of CGI programs wherein each corresponds to a user request action. Each user request from either a service user or the system administrator invokes a CGI program on the Web server. Each CGI program does the following:

parses the web CGI parameters;
invokes a WEB Services API routine using the parsed CGI parameters as arguments; and
returns the result to the Web browser.

Each CGI program returns the next HTML screen page of the user request.

The WEB Services API provides a user request level interface to Service Management APIs. It consists of a set of APIs between the CGI program and UNI/PVC APIs and System Management APIs. Each WEB Services API corresponds to a CGI program. Each API is defined as a dynamically linked library, such that multiple CGI programs can share a single copy of that API. Each WEB services API does the following:

validates user id with IP address;
validates user capabilities;
invokes some of the APIs in the Service Management module;
if returned object is a collection then filters/sorts the collection;
invokes a WEB Page Formatting API to compose a HTML screen page for the returned object as necessary; and
returns the composed HTML screen page.

The WEB Page Formatting API provide a common page formatting interface to WEB Services APIs. This API is a set of class methods that WEB Services APIs invoke to build HTML pages. Each WEB Page Formatting API builds a generic HTML page or a portion of a HTML page.

Each class method composes a HTML screen page for a given object or a collection of objects. Each class method returns the composed HTML screen page.

The Service Management module consists of two parts: one having functions for service end-users, and the other is for service provider administrators (or service provider end-users). Service end-user actions are served by a UNI, PVC, UNI List, PVC List, End Point, and Performance Collection API that encapsulates the representation details of these services. Service provider administrator actions are served by a system information user, and customer API that retrieves and updates customer and user account data, service provider information, as well as license information. The system information cache constitutes shared memory in RAM, in which the customer and user profile data together with the system data are stored.

As shown in FIG. 3 the Service Management Module includes a number of APIs and a cache memory. The Performance Collection API provides disk file storage for user requested performance data.

The performance data can be stored on disk files in an ASCII format readable by an application such as Microsoft Excel. As a Performance Report screen is being generated, the data set is saved to a temporary file. A user request to "Export Raw Data" causes this temporary file to be renamed to a specific file name.

The PVC API provides a service level interface to access object identification (OIDs) associated with PVCs. It is an API between client UI and CSM Agent Informix database for configuration and status data of PVCs. Performance statistics data are also taken directly from the CSM Agent database via SQL queries. The API is defined as a dynamically linked library, such that multiple CGI programs can share a single copy of this API. Methods include:

for each PVC, read of any specified OID; and
for each PVC, write of alias;
The PVC API uses the CSM Agent database for PVC data. SQL queries are used to get data.

The UNI API provides a service level interface to access OIDs associated with UNIs. The UNI API is an API between client UI and CSM Agent Informix database for configuration and status data of UNIs. Performance statistics data are also taken directly from the CSM Agent database via SQL queries. The API is defined as a dynamically linked library, such that multiple CGI programs can share a single copy of this API. Methods include:

for each UNI, read of any specified OID; and
for each UNI, write of alias
It uses CSM Agent database for UNI data. SQL queries are used to get data.

The PVCList API provides a service level interface to access managed object indices associated with PVCs for a specified community. PVCList should also provide APIs for retrieving information of PVCs related to specified UNIs. It comprises an API between client UI and CSM Agent Informix database for retrieving specified information on a specified UNI. The API is defined as a dynamically linked library, such that multiple CGI programs can share a single copy of this API. It Uses the CSM Agent database for PVC data. SQL queries are used to get data.

The UNIList API provides a service level interface to access managed object indices associated with UNIs for a specified community. The UNIList API is between client UI and CSM Agent Informix database for retrieving specified information on a specified community. The API is defined as a dynamically linked library, such that multiple CGI programs can share a single copy of this API. It uses the CSM Agent database for UNI data. SQL queries are used to get data.

The End Point API provides a service level interface to access End Point managed objects. It consists of an API between client UI and CSM Agent Informix database for retrieving specified information on specified End Point. The API is defined as a dynamically linked library, such that multiple CGI programs can share a single copy of this API. It uses the CSM Agent database for End Point related data. SQL queries are used to get data.

The System API provides a service level interface to access all system management information, related service provider information, start/stop system, report status of the system, and license information.

The System API is between client UI and System related information. Each API is defined as a dynamically linked library, such that multiple CGI programs can share a single copy of that API.

UNIX scripts are used to start, maintain, stop and report status of the process management daemon. API between client UI and system license information includes the following methods:
convert to system license information from application key;
upgrade system license based on the new application key; and
report current license information and license utilization data.

It uses shared memory segments to cache data. Each update to the memory is written back to the disk files. RogueWave tools.h++ is used to support data persistency for non-shareable data.

User account API uses license information to limit the number of users supported by the system.

CGI programs use service provider information to generate customized page.

The System Information Cache provides an internal interface that is used by the components from the Service Management block, for communicating with shared memory. It comprises an API used for communication with the shared memory segments. Its methods include:
attachment of the shared memory; and
detachment of the shared memory.

Any interaction with shared memory needs to go over this interface.

The Customer API provides a service level interface to access customer and service provider data. It is an API between client UI and customer information and provides the following:
a list of customers;
for each customer, read and write of any specified field;
create new customer; and
delete an existing customer.

A usage counter is maintained for each customer both in cache and on disk files. The counter increments each time a user of that customer logs in. Any write operation to the memory system information also writes to corresponding customer and service provider data disk files.

The User API provides a service level interface to access user account data. It is an API between client UI and user account information and provides:
a list of user accounts;
for each user account, read and write of any specified field;
create new user account; and
delete an existing user account.

Internal data per user account includes:
last login date and time;
service user phone number;
service user note pad;
service user confirmation enabled;
number of consecutive service user login failures;
UNI filter criteria;
UNI sort field;
UNI sort ordering;
PVC filter criteria;
PVC sort field; and
PVC sort ordering.

Any write operation to memory system information also writes to a corresponding user account files. It uses customer and service provider data API to get a list of available customers. Netscape Enterprise server is used to store user account and password, and to enable/disable user accounts.

Memory System Information provides an in-memory cache for system information files. It consists of C++ data structures residing in shared memory, used to store system information read from disk files. Data cached are:
system mode;
CSM Agent status; and
system information.

RogueWave tools.h++ is used for the following data:
customer data;
service provider information; and
user account data.

APIs are used to access the above information.

The Database Utility API provides tools for accessing Informix database. Database Utility API will also provide functions for opening and closing database. A Database Utility API will be used by the other API modules for accessing Informix database.

The Process Management module is responsible for process running and monitoring. It starts the respective processes and ensures each is still running; processes are restarted if necessary. Also, Process Management kills other processes for a graceful shutdown.

As shown in FIG. 3 the Process Management Module Includes a SD_Daemon which provides process startup, creation of shared memory segments, and control of the running processes. It makes use of CSM Agent code for management of processes. Its functionality includes:
running processes;
checking if the processes are running; and
creation of the shared memory segment.

The Event Logging module is used by client UI, service management and process management modules to report any software log or user event. Events are first logged to a shared memory segment. ELS collector then copies the event logs to disk files. A user event daemon is used to further filter and convert user events from the disk files into readable ASCII user event files.

The Event Logging Module shown in FIG. 3 includes an ELS API, an ELS Collector, an ELS Log, a User Event Daemon, and User Events.

The ELS API provides a common logging service that is used by client UI, service management and process management to log user events and software problems. This API is taken directly from the Network Managers (46020, for example) SW_Error and ELS APIs. New event descriptors are introduced for each required source code file. Each new source code file is required to declare and use its own event descriptors to uniquely identify potential software problems within that file. Data are logged to shared memory by applications. Event descriptor parsing needs to be called in each build.

The ELS Collector collects logs from various applications. A C process is built based on 46020's ELS collector. Data are read from shared memory and then logged to hard disks.

The ELS Logs provide persistent logs which are kept in a format identical to 46020's ELS and can be examined via 46020's logtool.

The User Event Daemon generates user events based on the logic in 46020 ELS "log" process to generate user events. It also manages the available disk files for user events. The daemon retrieves and filters out user event associated logs from the disk log files generated by ELS collector, and dumps the user events to a list of user event files in the format defined by the user event descriptors.

User Events provide persistent user events which are kept for further processing, like billing and can be examined via any text editor.

To make CGI processes lightweight, a dynamic linking library whereby executable routines are loaded into memory is used, and shared memory is used for inter-process communications. User, customer, service provider, and system information are stored in a shared memory segment, specifically the System Information Cache, accessible from the dynamically linked libraries. Each CGI process handles the request on its own, with the assistance of dynamically linked libraries, to access the shared memory. The shared memory is described in greater detail later.

Moreover, any persistent data that is Service Director specific and is not available in the CSM Agents Informix database are stored in the shared memory.

The information related to the customer, user, service provider, and system in general will also be backed up on the hard drive. The cron job will trigger the backup process periodically. The default interval is 15 minutes.

Netscape Enterprise server 2.0 spawns a CGI process for each user action taken by a Web user. This CGI process then executes the corresponding CGI program. Binary executables are bundled together with Netscape Enterprise server for managing user accounts and passwords. Passwords are not maintained in standard UNIX file/etc/passwd.

Essentially, every navigation action taken by the user will trigger a CGI process that determines the next page to present. For each CGI process, user access is validated quietly in the background. There isn't really a user session for each login to Service Director.

Netscape server plug-in API is a set of ANSI C functions that enables users in tailoring Netscape Enterprise servers behavior. Server's plug-in functions may be created or altered by this API. For example, functions can be created for access control of the Service Director.

User access authorization is achieved via user account ID and IP address. User Ids and IP address are transferred within HTTP protocol request and response header for each request and response. Both user Ids and IP address are used for subsequent access authorization of CGI programs.

There is a web-based file transfer function embedded in Service Director. It can be triggered by pressing the corresponding button on the navigation frame. Directories are created for each customer. Users within each customer share the same directory.

All user accounts of a particular customer share a common directory. Upon creation of a customer account, a directory for the customer is created with the correct read/write permission. User Ids and IP address are used for directory access authorization. An individual user can access only his assigned customer directory. The user cannot discover the existence of other customers.

An internal user is created by configuring the user as "internal" from the user account management page. An internal user account type has the same look and feel as a regular customer user except for a slightly modified welcome page. There is a drop box selection menu that allows the user to switch to another customer portfolio and act as a user from that customer. By switching it is meant that no login procedure is needed. This internal user (or super user) is intended for the service provider only.

Direct Informix queries to the CSM Agent database are chosen as the mechanism for retrieving configuration and historic performance statistics data because one SQL query can retrieve multiple intervals of statistics or configuration data for multiple network objects. Other vital, invisible data items, such as time stamps of statistics intervals, can be retrieved and used for performance reporting.

This approach does not cache any configuration and historic performance statistics data. Each configuration and/or performance report triggers database queries to the CSM Agent database.

In the Service Director Server/Application there are a number of high level interactions between software modules in response to common, representative external and internal events. The following gives an overview of the functional division of the Service Director.

With the User Login a user logs in as either an internal/external service user, or an administrator (i.e., admin account). Login may succeed or fail. Failure reasons are invalid password, disabled account, non-existent account, multiple logins, server status locked, or unavailable service.

Upon user login, a login CGI program is fired up. The Login QGI uses the system shared memory's simple user database for user access authorization. If login is successful, the CGI program calls Web API, which again calls System API, to construct the users welcome screen. System then changes the status of the user account to active.

If the system service is not available, or the user account is disabled, or the user is already logged in, as reported by System API, an error notification screen is constructed to notify the user of the specific reason. If login failure is reported by the Login CGI process, an error notification screen is constructed with a specific reason, i.e., non-existent account, invalid password.

Each login attempt is logged as a user event, regardless of whether the attempt succeeds or not.

Details respecting the log in mechanism follows.

The Inactive User Auto Logout automatically logs out an inactive user, regardless of whether it is an internal/external service user, or an administrator.

The auto logout cron job is used to automatically log out inactive users. Once an active user is logged out, any further action taken by the user leads to an error notification screen. The user is required to log in again. The cron job is started every 10 minutes to clean up inactive users. The cron job calls the System Management API for inactive auto logout period. For each active user, it calculates whether the inactive period is greater than or equal to the system parameter. If so, that user is automatically logged out, System Management API is then used to delete the active user, and a user event is generated.

The side effect of the approach is that an inactive user may be logged out 10 minutes later than what the system parameter specifies, due to the cron job scheduling period.

Service User Actions include Get and Set Operation; Sorting and Filtering; Export Performance Report Data; and Server Start, Stop and Status.

The Get and Set Operation gets data for related managed object, and sets data directly to the CSM Agent. Upon user login, data associated with the customer are polled by the system on request.

Get Data: UNI/PVC API or System Mgmt API CSM Agent database for the item. In normal operation, data are returned. If the response is expired, a response HTML page is constructed to notify the user to wait. If the response is undefined, UNI/PVC API informs the user that information is not available. In any case, Web API is used to form the new HTML page. The number of gets performed for the user action is logged to User Events by UNI/PVC API.

Set Data: UNI/PVC API calls CSM Agent database to set. The response is used by Web API to form a new HTML page. The number of sets performed for the user action is logged to User Events by UNI/PVC API.

The Sorting and Filtering operation handles sort and filter configurations and performs sorting and filtering of data. Sorting/filtering fields and ordering are maintained internally per user by the system. Upon reconfiguration or user action, the system's internal shared memory is accessed and updated for the sorting and filtering criteria as follows:

Sorting: This action will be done on the user side in the Java applet.

Filtering: Upon click of filtering field, a CGI program is started to retrieve the current filtering criteria CSM Agent database via User API and format them via Web API. Upon applying filter preference, a filter preference CGI program is started to save the filtering criteria to In-memory System Info via User API. The CGI then retrieves all the data, again via UNI/PVC API and re-sorts/re-filters the results and forms the first page UNI or PVC list via Web API.

The Export Performance Report Data operation saves current viewed Performance Report data to a disk file. Data set of the current display graph is exported to a file on a pre-defined user-specific directory on the Web server. As a Performance Report screen is being generated, the data set is saved to a temporary file (e.g. perf1.tmp), and the temporary file name is a hidden field in a generated HTML page. A user request to "Export Raw Data" causes this temporary file name to be passed back to the Web server and renamed to a specific file name (e.g. perf1.rpt) in the predefined user-specific directory. The current date and time are used to make the file name unique. The name given to the permanent file may be specified by the user. The data can be accessed via a file transfer protocol from the user-specific directory. All hanging temporary files are deleted upon "User Logout" or "Inactive User Auto Logout".

The Export Raw Data function allows a user, while viewing performance reporting screens, the capability of saving data points of the performance graph to the user's Web directory as provided by the Service Provider. The data points may be saved using Excel. The system allows a user to retrieve files, generated via the Export Raw Data function from the user's Web directory to the user's local personal computer or workstation. This allows the user to view and manipulate his local copy of the data set using an application such as Excel.

Server Start, Stop and Status are basic system maintenance functions. Start, Stop puts the system into maintenance mode, monitors and reports server daemon process status. Upon click of Server Mgmt from dashboard, a server mgmt CGI is started, which accesses System API to examine the current system mode and server process status, and forms an HTML page via Web API. Upon click of Start Server, Stop Server or Maintain Server, a corresponding CGI program is started to handle the basic system maintenance function. Each CGI is simply a UNIX script.

The process for each of the maintenance functions follows:

1. Start Server: Start up any server daemon process that is not already up. Set system mode to up. Typical system startup sequence is as follows:
   a. Start Netscape Enterprise server 2.0 daemon;
   b. Load all system management information into System Info Cache shared memory;
   c. Create shared memory segment for ELS collector and start ELS collector process;
   d. Start User Event Daemon process;
   e. Schedule auto logout cron job and server status monitor cron job;
   f. Load all dynamically linked libraries, i.e., UNI API, System API, Web API; and
   g. Set system mode to up.
2. Stop Server: Gracefully stop and then forcefully kill all server daemon processes. Shared memory segments are not removed. Set system mode to down.
3. Maintain Server: Set system mode to maintenance. Automatically log out all active service users by using System API to delete active users.

The User Event Logging function logs a service user's get operations per user action.

The number of get operations on the service management level is recorded per user action. A get operation presents the equivalent of a user action. Service user's set operations are logged similarly. The UNI inventory list action from dashboard is used to illustrate the user interaction.

Upon click of UNI Services from dashboard, a UNI service CGI program is started up, which accesses UNIList API to retrieve a list of UNIs for the service user. All corresponding fields are retrieved per UNI using UNI API. Web API then generates the response to the user action and also uses ELS API to log made action. ELS Collector process periodically polls the ELS shared memory log and writes them to Logs. The daemon process User Event Daemon consistently receives updates to the Logs, filters out user events and writes to User Events disk file.

As previously discussed the present invention relates to an Internet-enabled service management system and method that enables the customers of a service provider with web-based access to manage the services they receive from a service provider. The management capabilities of the system include the ability to perform performance and configuration management on network services provided by the service provider.

One of these SD applications performs user validation and prevents multiple logon of identical user Ids through the Internet. According to this aspect a user's session is timed out after a period of inactivity between the user's browser and the server application.

In the past, a user logs on to an Internet application by providing a User Id and User Password. The user remains logged on to the system until either the user logs out of the application or the user's session is timed out by the server application. Due to the statelessness of the HTTP protocol, this mechanism does not allow multiple logon of identical user Ids. It presents a problem if the user's Internet browser crashes and the user wishes to re-logon to the system; the user would have to wait until his previous session is timed out by the server application before he can re-logon to the application. This logon mechanism also disallows a user from switching to another workstation to logon to the application whilst having a current active session on another workstation; the user either needs to log out from the application from his original workstation or wait until his current session is timed out by the server application before he can logon from another workstation. To solve this problem, a new logon system is created. This new logon authentication system prevents multiple logon of the same logon Id and the ability to accommodate subsequent logon when a user's Web browser has crashed or the user is operating from another workstation.

The SD application logon authentication aspect prevents multiple logon of identical logon Id with the ability to accommodate subsequent logon when a user's Web browser has crashed with the ability to logon from another workstation whilst having a current active session on another workstation.

In accordance with this aspect the application maintains a list of users. For each user the application stores a user Id, a user password, status, and an IP address. When a user requests access to the SD application, the application requires the user to enter a user Id and a user password. The application validates the information provided against the list of users stored in the application. If the user name and password matches, the application checks the user's status in the application. If the user's status is "enabled" then the user is logged onto the system and the user's status is changed to "active". The IP address of the user's workstation is retrieved through the environment variable "REMOTE_ADDR" by the server application. This IP address is saved in the user's IP address field. If the user's status is "disabled" then the user is rejected. If the user's status is "active", then the application determines if the IP address of the current request matches with the stored user's IP address. If the IP addresses match, the user is logged on to the application. However, if the IP addresses do match (i.e. multiple logon of a user with the same user Id has been detected), a log out form will be displayed to inform the incoming user that a user with the same user Id is already in the system. The application will prompt the user to log off the other session.

To enforce the user logon, functions defined using Netscape Server API are to be created. Since Netscape Server will respond to every incoming request from clients, functions can be used to authenticate users before the server starts to service the request.

Four functions are defined using Netscape Server API. The first function services the logon process. It checks the user Id and password against the list stored in the application. It sends out a JavaScript cookie to the client after the user Id and password are validated. The second function services the log out process.

The third function services the log out form. For example, when a user tries to log into the system with a user Id which belongs to someone who has already logged onto the system (i.e. multiple logon has been detected), a log out form will be displayed to inform the incoming user that a user with the same user Id is already in the system, and prompt him to log off the other session.

The fourth function will verify the JavaScript cookie to see if the server will go on to service the request at all.

Figure 4:
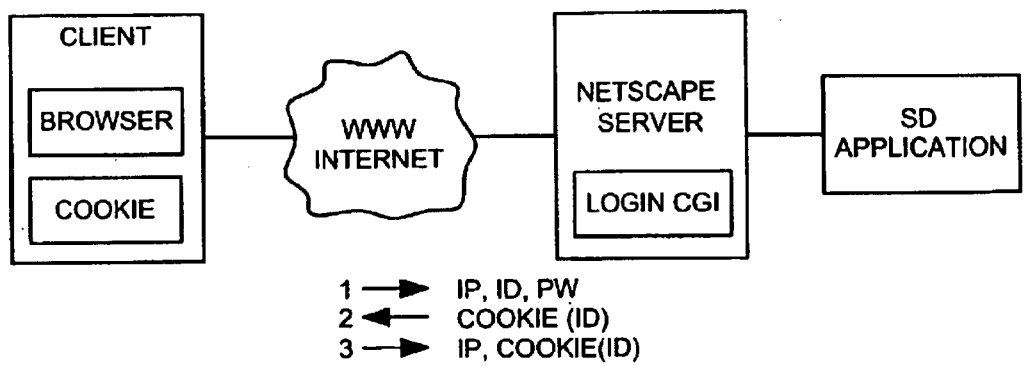
FIG. 4 depicts information flow between client and server in the multiple login process.

FIG. 4 illustrates the flow of information between the client and server. The client sends a TCP/IP message containing user Id and password to the server. The IP address of the client is included in the TCP/IP message. If the client is authorized the server returns a welcome page together with a JavaScript cookie, which contains the user Id, to the client. The client browser matches the URL destination (domain) address to that of the cookie. It then sends the cookie together with the query to the server.

The JavaScript cookie expires at the end of the session i.e. logout or browser terminated.

Figure 6:
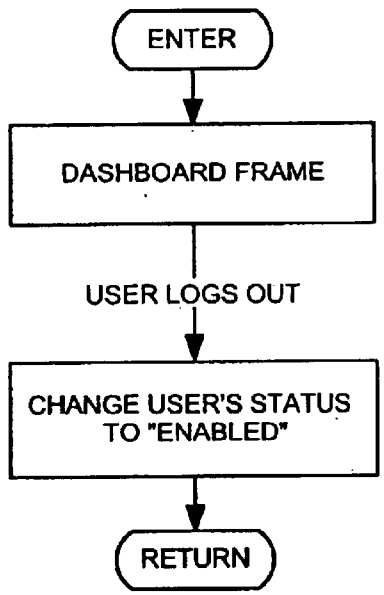
FIG. 6 is a flow diagram showing a log out process.
Figure 5:
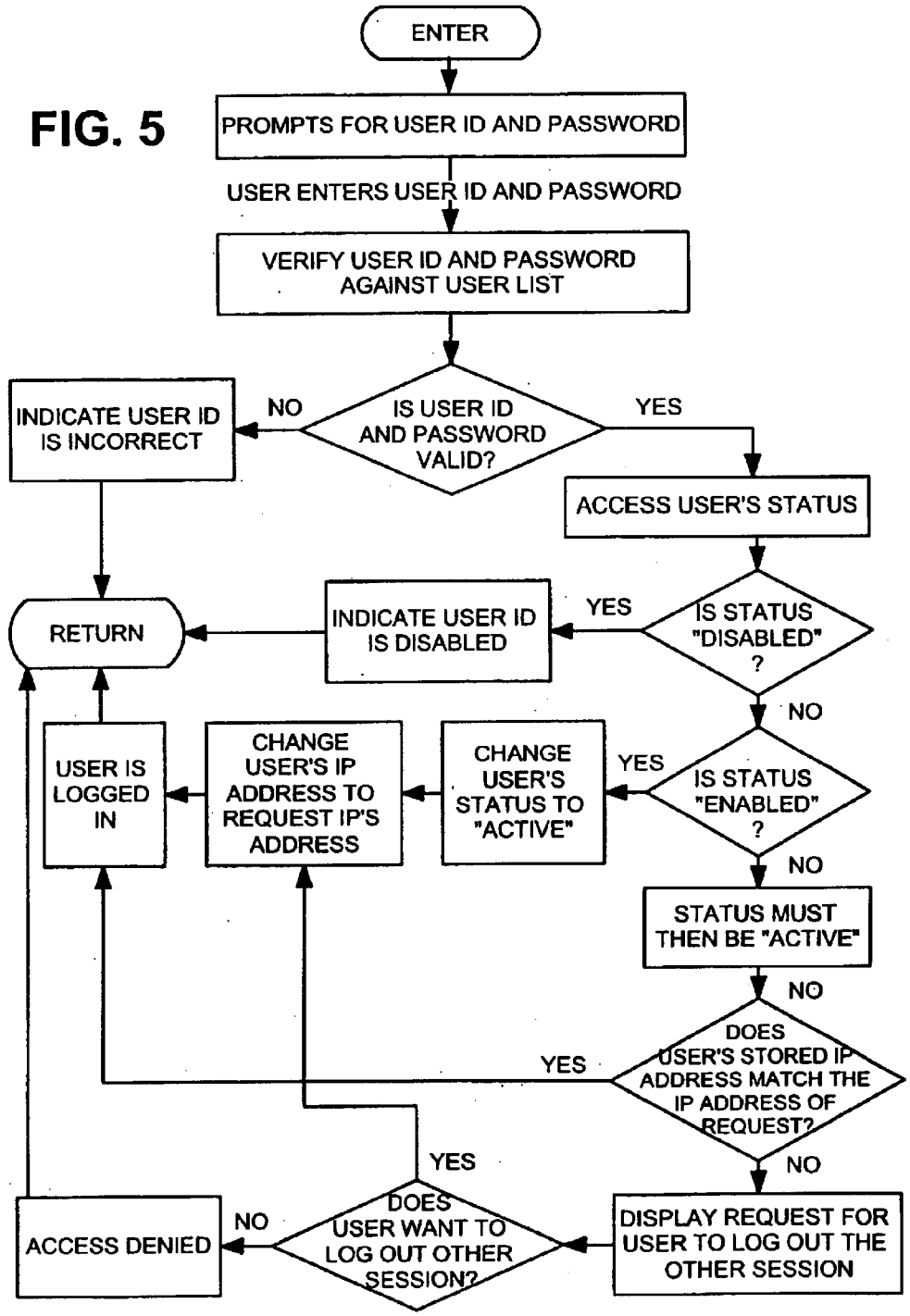
FIG. 5 is a flow diagram illustrating the multiple login process of FIG. 4.

FIG. 5 is a flow diagram illustrating the multiple logon mechanism. FIG. 6 is a flow diagram illustrating the logout process.

Although the foregoing description is based on the CSM SD application it is to be understood that the basic functionality which prevents multiple logon is not limited to this system and can be implemented in other client-server applications.

Another aspect of the present invention relates to online context sensitive help wherein the SD application provides a user friendly explanation of the current content in its content frame window.

In the past, a user using an Internet based application would invoke context sensitive help information by clicking on a link on the content page. Due to the nature of Web browsers, the browser display area is usually smaller than the display HTML page; thus a user would need to scroll the entire frame to view all of the page context. It creates a problem that a user might have to scroll the page to find the context sensitive help link for invoking the help feature. Furthermore, if the help link was not implemented on the display page, a user would be unable to get any help information.

Figure 7:
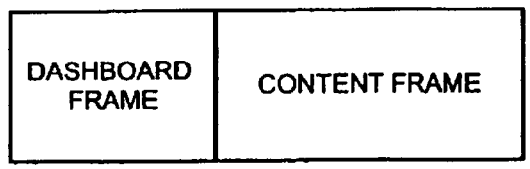
FIG. 7 illustrates a dashboard frame in a CSM Service Director application.

This aspect of the present invention solves the aforementioned problem by creating a new context sensitive help mechanism. This new mechanism provides a consistent context sensitive help button on the "dashboard" frame as shown in FIG. 7. A user is able to click on the Help button on the dashboard and be presented with information relating to the current right frame screen. The Help information is presented as a new web browser. The help screen is updated as the user navigates to different screens and selects the help button.

The navigation frame (i.e. the left frame) of the help window allows a user to navigate through the help documents. The content frame (i.e. the right frame) of the help window contains the selected help content. The navigation frame contains a CSM SD application like dashboard and additional help topics. A click on the dashboard or on a help topic, or through context sensitive help from the application updates the content frame with the corresponding help text.

The SD application's context sensitive help invention provides the user with a consistent place to invoked context sensitive help. Context sensitive help is invoked from a link in the "dashboard" frame window. This mechanism allows the creation of a help window from the application screen with or without special HTML tag encoding in the content frame's HTML page. The content sensitive help frame can also be invoked as a stand-alone application. If the context sensitive help window is invoked from the SD application with special HTML tag encoding in its context HTML page, context sensitive information will be presented, otherwise, a default help information page will be presented.

The application, in addition to generating HTML contents for presentation, generates the following HTML tags:
In each Content Frame page:

<Form Name="helpForm">

<Input Type="hidden" Name="screenID" value="(a screen identifier)">

</Form>

The Dashboard frame contains JavaScript code to create a new browser Help Window.

The Help Window frame requests more HTML help contents from the SD application server. The resulting request contains JavaScript code to look into it's opener (i.e. parent) window to check if it has a Content Frame with a "screen Id" tag. This "screen Id" tag is mapped to a corresponding help URL by the Help Window for displaying help information in the-Help Content Frame that corresponds to the "screen Id" tag. If "screen Id" is not present, then a default help page will be presented.

An example of a JavaScript code for implementing the help feature in the CSM SD follows.

```
<HTML>
<HEAD>
<TITLE>CSM SD Documentation</TITLE>
</HEAD>
<SCRIPT LANGUAGE="javaScript">
window.onerror=null;
function cleanUp( ) {
if (navigator.userAgent.indexOf("3.0")!=-1)
parent.window.opener.helpWin=null;
else
parent.window.opener.top.helpWin=null;
}
function gotoContextHelp( ) {
var helpPath="/SD/SDWBUI/";
var helpIndex="";
if (navigator.userAgent.indexOf("3.0")!=-1)
helpIndex=
parent.window.opener.frames[1]
   .document.helpForm.screenID.value;
else
helpIndex=
parent.window.opener.top.frames[1]
   .document.helpForm.screenID.value;
var newURL=helpPath+"index.html";
if (helpIndex=="640")
{
newURL=helpPath+"TP/1welcome.html#b9086";
}
```

```
if (helpIndex=="300")
{
newURL=helpPath+"TP/2netport.html#b9022";
}
if (helpIndex=="310")
{
newURL=helpPath+"TP/3frport.html#b4450";
}
if (helpIndex=="400")
{
newURL=helpPath+"TP/5pvcall.html#b9244";
}
if (helpIndex=="410")
{
newURL=helpPath+"TP/7frpvcs.html#b9103";
}
if (helpIndex=="500")
{
newURL=helpPath+"TP/12traf.html#b4531";
}
if (helpIndex=="510")
{
newURL=helpPath+"TP/12traf.html#b4536";
}
if (helpIndex=="520")
{
newURL=helpPath+"TP/12traf.html#b4540";
}
if (helpIndex=="530")
{
newURL=helpPath+"TP/12traf.html#b4546";
}
if (helpIndex=="540")
{
newURL=helpPath+"TP/12traf.html#b4546";
}
if (helpIndex=="550")
{
newURL=helpPath+"TP/12traf.html#b474";
}
if (helpIndex=="610")
{
newURL=helpPath+"TP/16prefs.html#b4558";
}
if (helpIndex=="620")
{
newURL=helpPath+"TP/15comm.html#b4554";
}
if (helpIndex=="630")
{
newURL=helpPath+"TP/15comm.html#b4557";
}
if (helpIndex=="710")
{
newURL=helpPath+"TP/16prefs.html#b4564";
}
if (helpIndex=="720")
{
newURL=helpPath+"TP/16prefs.html#b4569";
}
if (helpIndex=="320")
{
newURL=helpPath+"TP/4atmport.html#b9030";
}
if (helpIndex=="440")
{
newURL=helpPath+"TP/9mclist.html#b8381";
}
if (helpIndex=="420")
{
newURL=helpPath+"TP/8vccvpc.html#b7364";
}
if (helpIndex=="430")
{
newURL=helpPath+"TP/11mcvc.html#b9090";
}
if (helpIndex=="450")
{
newURL=helpPath+"TP/10mcdet.html#b9087";
}
if (helpIndex=="810")
{
newURL=helpPath+"TP/13atmtr.html#b9099";
}
if (helpIndex=="821")
{
newURL=helpPath+"TP/13atmtr.html#b9100";
}
if (helpIndex=="822")
{
newURL=helpPath+"TP/13atmtr.html#b9102";
}
if (helpIndex=="830")
{
newURL=helpPath+"TP/13atmtr.html#b9101";
}
if (helpIndex=="831")
{
newURL=helpPath+"TP/13atmtr.html#b9101";
}
if (helpIndex=="900")
{
newURL=helpPath+"TP/14trans.html#b8727";
}
this.frames[1].location.href=newURL;
}
</SCRIPT>
<FRAMESET ROWS="75,*" onUnload="cleanUp( )"
onLoad="gotoContextHelp( )">
<FRAME SRC="top.html" NAME="dash" SCROLLING=
   NO
MARGINHEIGHT="0">
<FRAME SRC="TOC/index.html" NAME="content"
   MARGINHEIGHT="0"SCROLLING=YES>
</FRAMESET>
<
```

Figure 8:
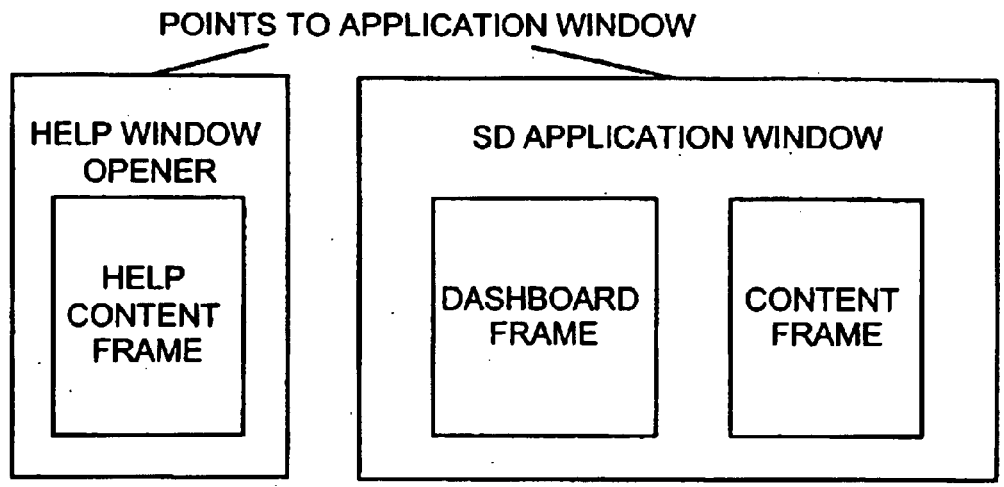
FIG. 8 shows a representation of an online context sensitive help frame.
Figure 9:
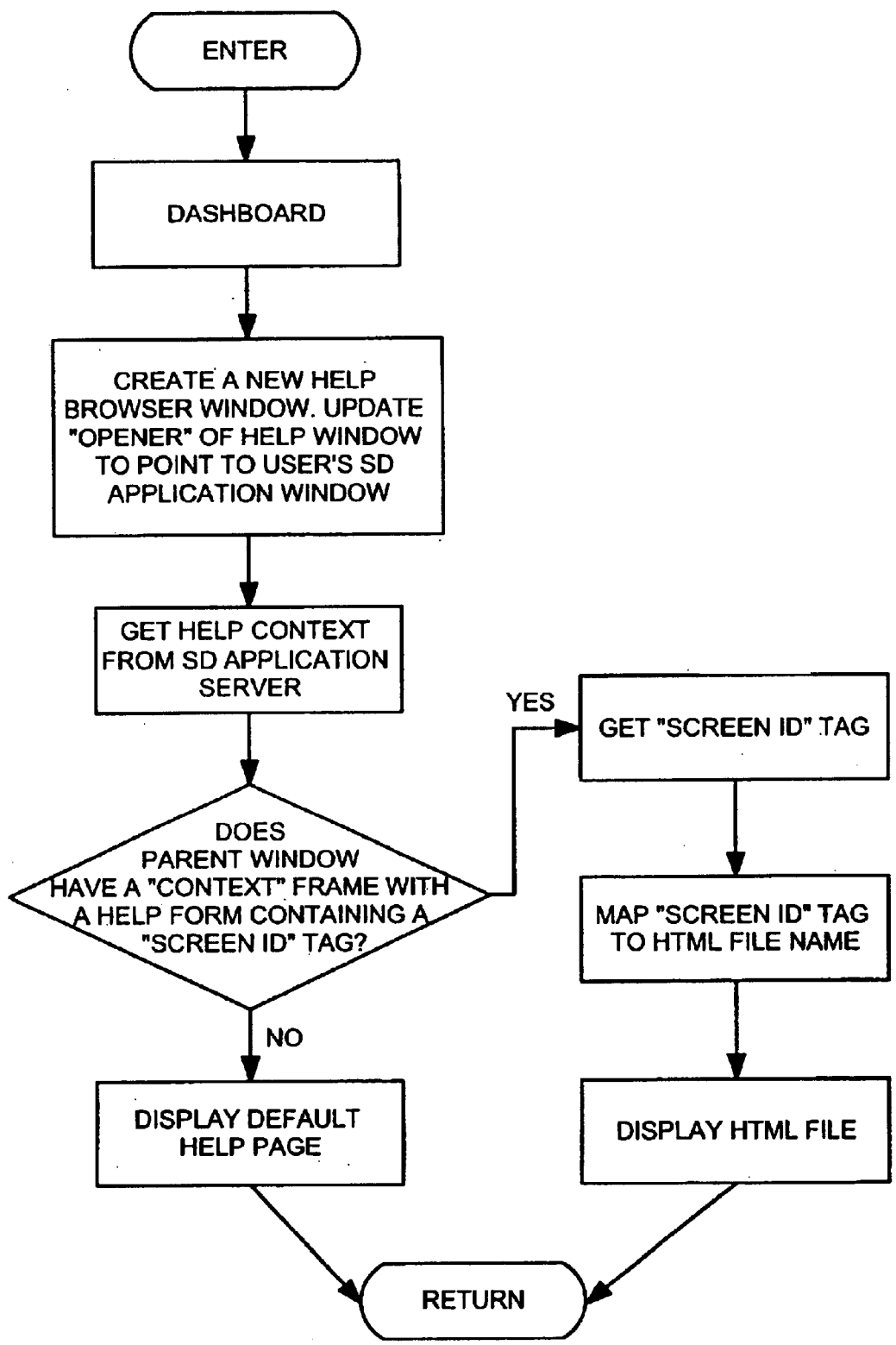
FIG. 9 is a flow diagram of an online context sensitive help process.

FIG. 8 illustrates the online context sensitive help frames and FIG. 9 is a flow chart for online context sensitive help process.

Again, this aspect of the present invention is not limited to the CSM SD application.

A further aspect of the present invention is concerned with configurable third party Internet application integration. The CSM SD application supports dynamic run time integration of external Internet applications. The applications can be configured during run time to run a given URL passing the URL a predefined set of URL parameters. This feature is accessed by a user from the dashboard frame of the SD application. In the present embodiment up to five applications can be supported but it is to be understood that this a system limitation and not a limitation of the basic concept.

In the past, HTML pages with third party Internet applications were programmatically generated with predefined URLs and links, in the form of graphical interface format (GIF) images. These URLs and GIF file names are coded into the software that generates these HTML pages. Once encoded into the software, these URLs and GIF file names are not changeable by the application end user. To solve the problem, a new mechanism is created. This new mechanism allows dynamic run time configuration of external Internet applications into the SD application.

The SD application allows the configuration of Status, Application Name, Button Image Path, URL, and Target Location via a Third Part Application Configuration Screen. (FIG. 10).

Figure 11:
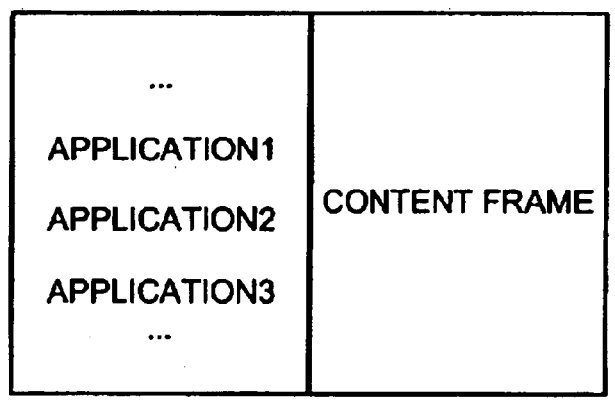
FIG. 11 represents third party application dual screen on an end-user's browser window.

Status allows the third party application to be enabled or disabled. Application Name is the name of the third party application. Button Image Path is the URL of the GIF file that represents the third party application. URL is the URL of the third party application. Target Location is the location where the third party application will appear when invoked by the user; the third party application can appear either in a new browser window or in the Content Frame. FIG. 11 depicts the third party application buttons on an end-users browser window.

Configuration of third party applications is a two step process. Firstly, the administrator configures the third party application via the Third Party Application Configuration Screen shown in FIG. 10. Then, the administrator configures each user to allow or disallow access to these configured third party applications.

Upon log on, each user will see assigned third party applications appearing in the dashboard frame of the SD application. The user can access these third party applications by clicking on these links and the corresponding Internet application will appear either in a new frame window or in the context frame.

The application contains a list of third party application specific information, namely: Enabled Flag, Application Name, Button Image Path, URL, and Target Location. A presentation process is used to present the list of third party application information for viewing and editing by the application administrator. The application also keeps a list of user attributes: user Log on Id, user name, customer name, community string (VSN), and a list of assigned third party applications. The SD application upon receiving the request to generate the dashboard frame for a user, determines if any of the third party applications has been enabled for this user. For each enabled third party application, a presentation process generates the corresponding HTML tag using the stored third party application information. The presentation process also generates a HTML hidden form tag containing the identifiers: userId, userName, customerName, communityString and their corresponding values. The generated HTML tags are inserted into the dashboard HTML page. The Dashboard Frame page contains the following code snip:

```
function submitCGIForm (aURL,aTarget) {
    document.CGIForm.action=aURL;
    document.CGIForm.target=aTarget;
    document.CGIForm.submit( );
}
<FORM NAME="CGIForm">
<INPUT TYPE="hidden" NAME="userId" VALUE="(some value)">
<INPUT TYPE="hidden" NAME="userName" VALUE="(some value)">
<INPUT TYPE="hidden" NAME="customerName" VALUE="(some value)">
<INPUT TYPE="hidden" NAME="communityString" VALUE="(some value)">
</FORM>
<A HREF=javaScript:submitCGIForm("http://(some URL)", "(target name)") onMouseOver="top.status='(some message)';return true"><IMG SRC=http://(some Gif file URL)
BORDER=0 ALT="(some message)"></A>
```

The generated dashboard HTML page is sent to the user's browser.

When the user clicks on an external application button, the corresponding CGI process is called using the URL information as configured on the Third Party Configuration Screen. The predefined URL parameters are sent along in the URL request via a JavaScript submit command. The resulting URL request is displayed either in a new frame window or in the context frame as configured in the Third Party Application Configuration Screen.

The four parameters of a user (user log on Id, user name, customer name, community string) will always be sent when an external application is called. These will also be the only parameters sent regardless of the page context. An external application can ignore its input and not make use of these parameters if it so chooses. All parameters from the application are passed to the external application through a "form" which is a standard feature in HTML 3.0 and later. "POST" method is used but this should not affect an external application's implementation.

The browser packages the parameters in a form to a special format called URL encoding before sending them out. URL encoding tacks all the keys and values together, replacing space and special characters where necessary. Parameters that have been URL-encoded can end up looking like the following example:

userId=admin&userName=CSM%20Admin&customerName=.

Because the parameters are passed to the external application in this URL-encoded form, an external application will have to decode the input before it can use the parameters. Decoding this information is a common task, and there are lots of tools for doing just that.

Figure 12:
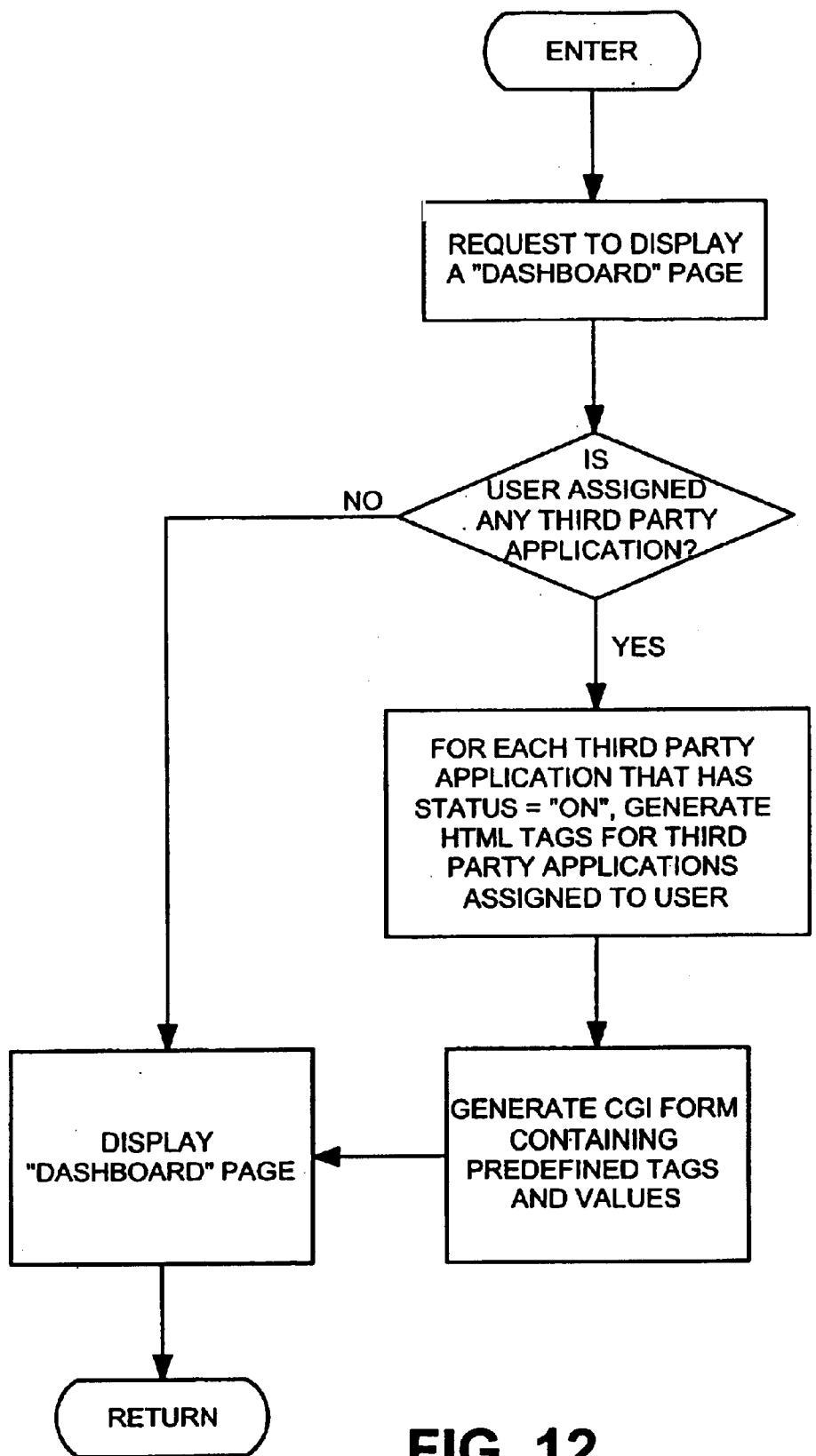
FIG. 12 is a flow diagram for a configurable third party Internet application integration.

FIG. 12 is a flow chart illustrating configurable third party Internet application integration.

A further aspect of the present invention relates to a function known as context switching to customer accounts. In this aspect the SD application allows privileged users to adopt identities of different customer accounts to trouble shoot problems with a particular customer, from that customer's point of view. The user selects a customer from a selection list that displays all of the application's customers. Upon selection of a customer, the user immediately adopts the identity of the selected customer. Three categories of end users are supported by this application. These are: external user or customer end user; internal user or service provider end-user who takes on role of a particular customer; and system administrator or a service provider end-user who has authority to configure the system.

In the past, for a user to adopt the identity of another customer in a system that required user authentication the following steps would be required: the user would have to log out from the user's current account and re-log in, into the application, using a log in Id configured for a particular customer. This mechanism makes the process of adopting different customer identity quite cumbersome for the user. This mechanism also adds additional overhead for the application administrator to maintain a list of privileged users for all customer accounts. To solve the problem, a new process of adopting different customer identity is created. This new identity adoption process allows a user to select a customer from a customer list and immediately adopt the new-identity without compromising the user authentication process of the SD application.

According to the invention the application maintains a list of users. For each user the application stores a user Id, a user password, a user type, and customer name. The value of User Type in the SD application is one of "internal", "external" or "System Admin". The application also stores a list of customers. "Internal" user type allows a user to have privileged access to information of all customers. "External" user type restricts a user to access only its assigned customer data. "System Admin" gives a user authority to configure the system.

The SD application upon receiving a request to display a "Welcome" page, initiates a presentation process to check if the current user's user type is of type "internal". If the user type is "internal" then it returns a HTML page that displays a "Switch Customer Account" presenting the list of customers for the user that are of user type "internal" else it returns a HTML page without this "Switch Customer Account" capability.

When the user selects a customer name from the list of customer names, a CGI process is called passing the selected customer name as a parameter. The CGI process then updates the user's customer name attribute to the selected customer name. The user has assumed the identity of the selected customer. All subsequent requests from the user's browser are now associated with the customer name of this user's customer name stored by the SD application.

Figure 13:
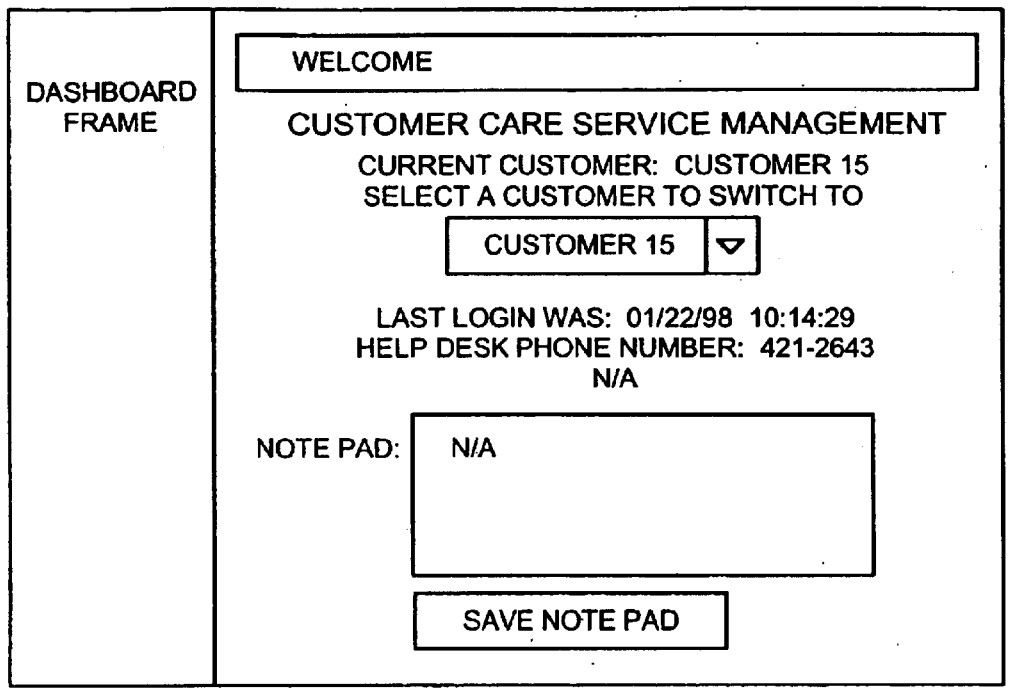
FIG. 13 illustrates an internal user's welcome context frame.

FIG. 13 shows an internal user's welcome frame. A pull down menu contains a list of all the customers that may be accessed by the internal user.

Figure 14:
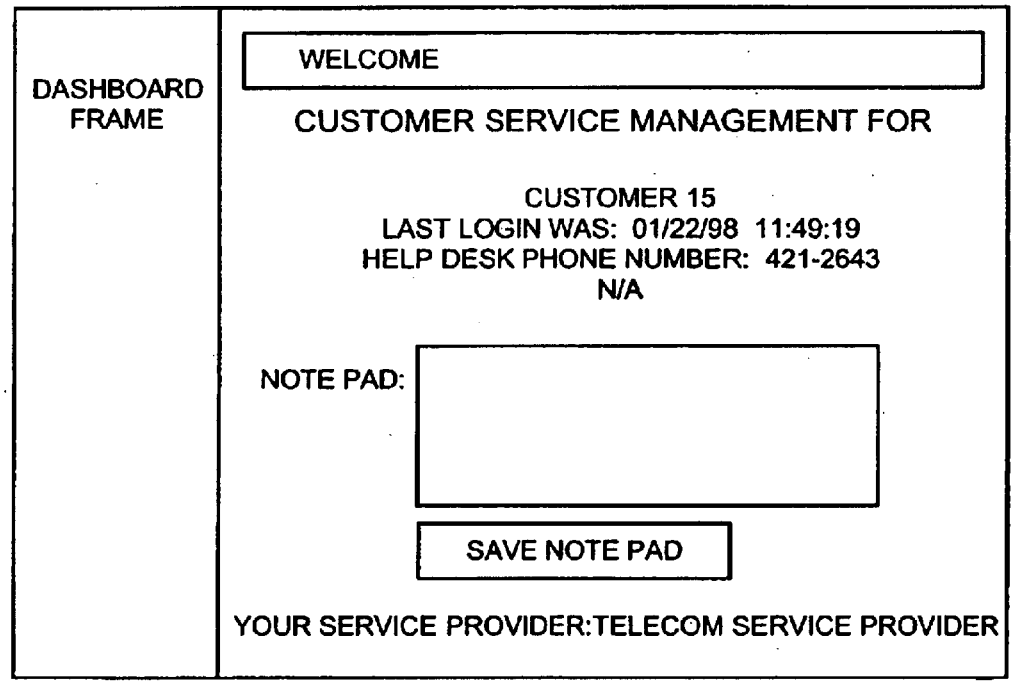
FIG. 14 illustrates an external user's welcome context frame.

FIG. 14 represents the welcome frame for an external user. In this frame the pull down customer list menu is missing. Subsequent frames for both type of user are the same.

Figure 15:
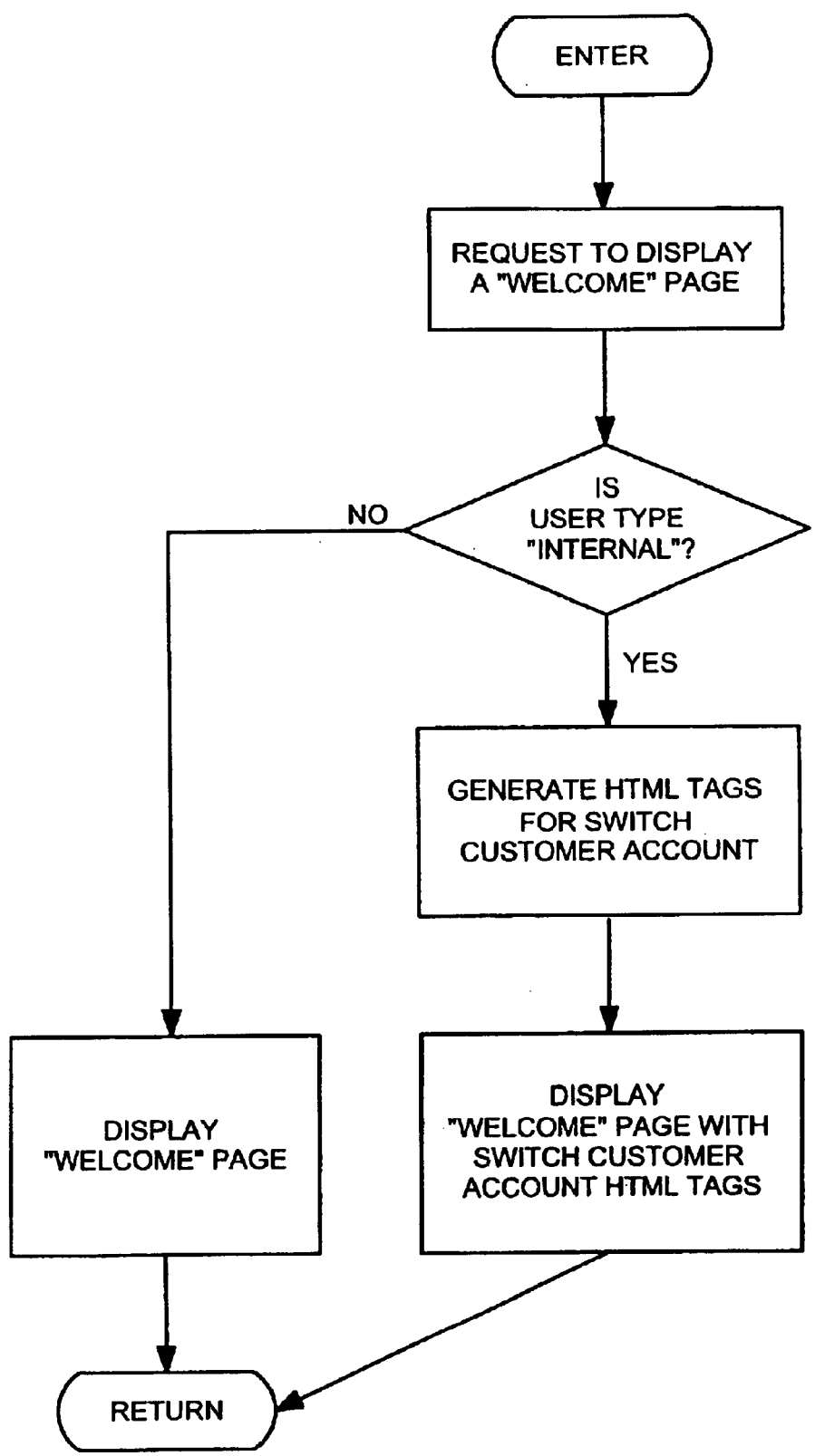
FIG. 15 is a flow diagram for context switching to a customer's account.

FIG. 15 is a flow chart of the process for context switching to a customer account.

Another aspect of the present invention relates to the previously discussed use of shared memory.

Unlike the Newbridge 46020 management system, the CSM Service Director provides network management in the context of network services. Hence there is a need to store extra information other then that which is extracted from the 46020, such as user and customer profile. With a predefined nominal capacity of housing 500 customers and 1000 users, the cost of maintaining another separate database in addition to the one of CSM Agents is difficult to justify. The natural solution to this type of situation will usually be to store this additional information on disk file.

However, the Web/CGI mechanism has already imposed a significant load on the Service Director's performance; adding the file I/O bottle-neck is undesirable, especially in a concurrent system.

To optimize the performance, instead of storing the information onto the disk directly, Service Director writes the information into shared memory, and then updates the information to the disk periodically using a background control process.

At the start up of the Service Director server, shared memory space is allocated and initialized by a daemon process. A handle to the shared memory is created and saved to a file. Server processes of user requests will look for that handle in order to access the shared memory. The structure and space requirement of the shared memory is also predefined. When a user's action requires access to the shared memory, the corresponding server process will use the structure definition as a map to access the shared memory space.

A separate background process is responsible for backing up the content of the shared memory. The process periodically updates the content to a backup file at a user-defined time interval. The backup file is used in system recovery and restart. The backup file is also updated right before system shutdown.

On the other hand, the daemon process creates a time-stamped backup of the shared memory at system startup time. It is done by making a copy of the latest backup file and renaming it with a timestamp. The reason is to archive and preserve the configuration of the system before every startup of the Service Director.

The shared memory is simply RAM that is used because access to a non-volatile storage device such as a hard drive is relatively slow. The fundamental idea is to read, in snapshot format from archive, into the shared memory and to write back again periodically.

Figure 16:
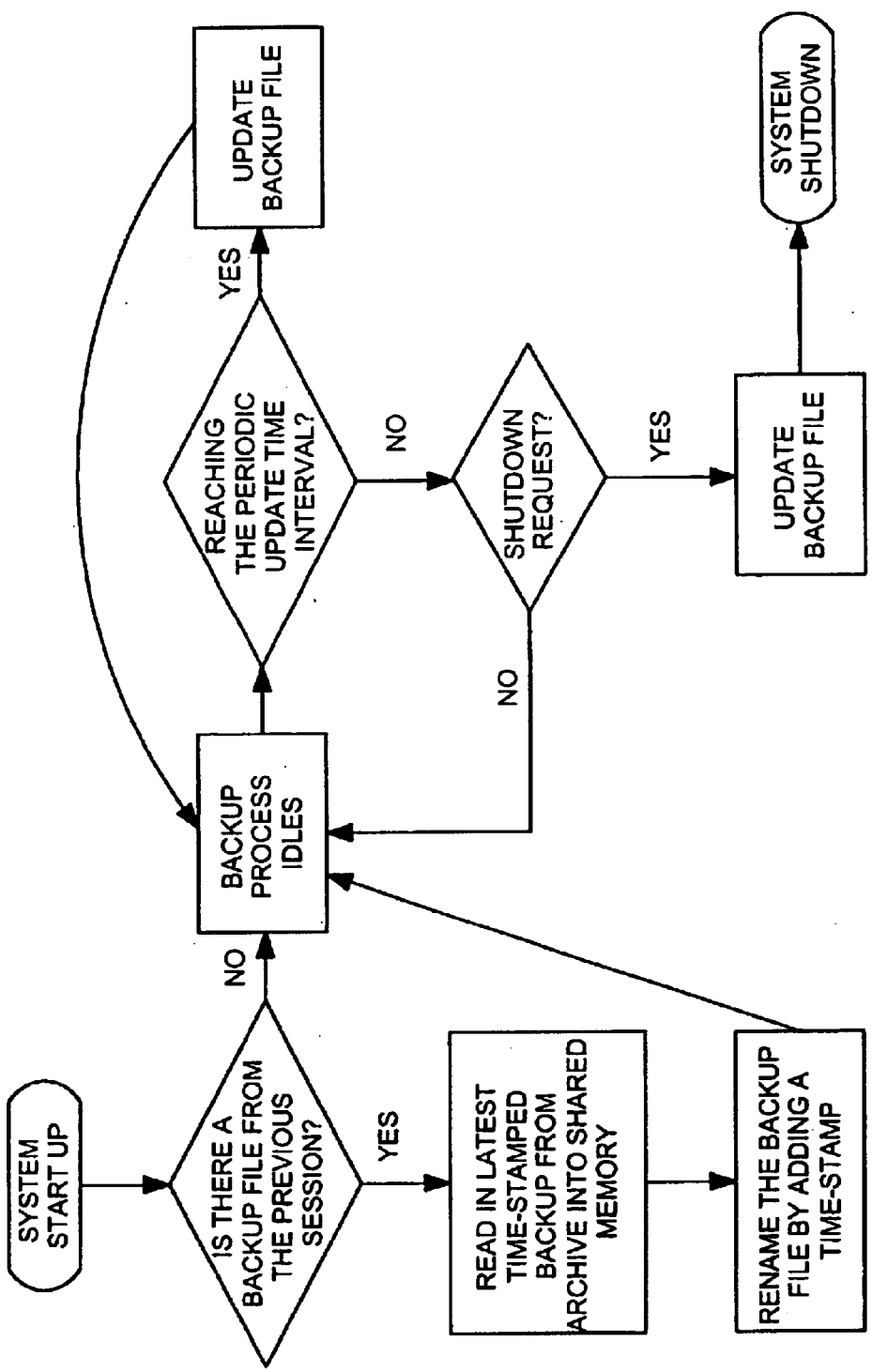
FIG. 16 is a flow diagram for the backup procedure in a shared memory application.

A flow chart showing the backup procedure is given in FIG. 16.

The CSM system provides customers of a service provider with a web-based access to manage the communications related services they receive from the service provider. It is advantageous for the service provider who may then re-sell the management capability to their customers or may use it internally as a tool for their Customer Service Representatives (CSRs).

The management capabilities of the system include the ability to perform performance and configuration management on services provided by the service provider, in particular, on the access ports and virtual circuits of the communications network assigned to a particular subscriber or customer. For example, the CSM system may be used by service end-users as a means to access information relating to their FR and ATM PVC and UNI services.

While particular aspects and embodiments of the invention have been described and illustrated it will be apparent to one skilled in the art that numerous alternatives and variations can be implemented. It is to be understood, however, that such alternatives and variations will fall within the scope of the invention as defined by the appended claims.

Glossary

The following definitions clarify terms used in the foregoing description and are presented here for the convenience of the reader.

ATM Asynchronous Transfer Mode. A switching/transmission technology which employs 53 byte cells as a basic unit of transfer. The ATM Cell is divided into 5 bytes of ATM Layer overhead and 48 bytes of ATM payload. ATM is fundamentally statistical in nature, with many "virtual circuits" sharing bandwidth.

ASCII American Standard Code for Information Interchange.

CGI Common Gateway Interface. A standard for interfacing external applications with information servers, such as HTTP or Web servers. A CGI program is executed in real-time, so that it can output dynamic information.

CSM Agent Customer Service Management Agent. CSM Agent accesses information from 46020 databases and provides users with statistics, configuration and fault information for the frame relay objects in their VSNS. Users access the information from the CSM Agent through a Customer NMS running a third party SNMP management application, such as HP OpenView.

CSR Customer Service Representative. A person working for a service provider to assist its customers.

Customer An organization that purchases network services in the form of a partition from a service provider.

FR Frame Relay. A data transmission technique that combines the high speed and low delay of circuit switching with the port sharing and dynamic bandwidth allocation capabilities of X.25 packet switching. Like X.25, frame relay divides transmission bandwidth into numerous virtual circuits and allows for bursts of data. But unlike X.25, frame relay does not require a lot of processing at each node, delegating error correction and flow control to the attached user devices.

FRL Frame Relay Link. A series of connections between two frame relay sources or switching circuits. Source circuits are the ingress points for frame relay (e.g., T1 DS-0s, Data ports). Switching circuits are Frame Stream Circuits on Frame Relay Switch and/or Frame Relay Engine Cards.

FRP Frame Relay Path. An end-to-end logical frame relay connection. Equivalent to a Permanent Virtual Circuit. FRPs exclusively use FRLs.

MIB Management Information Base. A collection of objects that can be accessed via a network management protocol.

OID Object Identifier. A unique identifier for a particular object type in a MIB. The value associated with the OID is hierarchical and so its naming convention also serves to identify the structure of object types.

PVC Permanent Virtual Circuit. An end-to-end logical connection.

RFS Release Functional Specification. A Contract between Engineering and the Business Units concerning the functionality for a particular release of a product. The line items of the RFS are later expanded by detailed functional specifications.

SD Software Design. Newbridge R&D document detailing the high level design of a software subsystem.

Service Provider The owner of a partitioned network.

Service User An owner of a user account within a customer or service provider organization.

SNMP Simple Network Management Protocol. A standard for the management of entities in a TCP/IP local area network.

UNI User Network Interface. The interface used to connect user equipment to network equipment.

User Account A Web access account of CSM Service Director. A user account is associated with an individual within a customer or service provider organization. A customer may have multiple user accounts.

VSN Virtual Service Network. A form of a partition which may contain path end equipment only. Bandwidth is drawn from the 'parent' partition which must be a VBN or the 'Supply Network'. The service user sees a physical view of path end network equipment and a logical view of connected paths.

What is claimed is:

1. A system for providing a selected user of an Internet-based web browser access to an external third party application through a web server comprising: means in said web server to configure information respecting said external third party application in order to provide access thereto by selected users; means at said web browser for inputting user specific login information; means at said server for receiving said user login information and determining if said user is one of said selected users; means in said web server for generating and returning to said browser an indicator for display on a dashboard on said web browser if said user is one of said selected users; and means to retrieve said external third party application for use on said browser if access thereto is permitted.

2. A system as defined in claim 1 wherein said configuration information includes user status, third party application name, image path, URL of said third party application, and location of said third party application on said web browser.

3. A system as defined in claim 1 wherein said login information includes user identification, user name, customer name and community string or virtual private network (VPN).

4. A system as defined in claim 3 wherein external third party applications which can be accessed by said web browser are displayed on said dashboard in response to a user login.

5. A system for providing a user of an Internet-based communication system selective access to information relating to other users comprising: a server having means to store a list of users including user access type, identification, password and name; a user client having means for a user to input identification and password information; and means at said server to compare said user input information with stored information and based on user verification and user access type provide said user with a list of other users for which said user has access.

6. A system as defined in claim 5 wherein said access type is one of internal, external or system administration.

7. A system as defined in claim 6 wherein a system administration access type allows a service provider end-user to configure said system respecting all users.

8. A system as defined in claim 6 wherein an internal access type allows said user to have access to information respecting all users.

9. A system as defined in claim 6 wherein an external access type allows said user access to information respecting selected users.

10. A system as defined in claim 5 wherein said system is customer service management system (CSM), said server is a CSM service director (SD) and said user operates an Internet based browser.

11. A system as defined in claim 10 wherein said other users are customers of said users.

12. A system as defined in claim 10 wherein said service director stores a list of users and a list of said user's customers, said customer's account information being available to said users depending on user access type as stored in said server.

* * * * *